United States Patent [19]

Miller

[11] Patent Number: 4,889,367
[45] Date of Patent: Dec. 26, 1989

[54] MULTI-READABLE INFORMATION SYSTEM

[75] Inventor: L. Michael Miller, Dallas, Tex.
[73] Assignee: Frito-Lay, Inc., Dallas, Tex.
[21] Appl. No.: 254,845
[22] Filed: Oct. 7, 1988
[51] Int. Cl.⁴ .................. B42D 15/00; G09C 5/00; G06K 1/00; G06K 7/10
[52] U.S. Cl. .......................... 283/88; 283/81; 235/462; 235/468
[58] Field of Search ............... 283/87, 88, 89, 90, 283/92, 81; 235/462, 468, 491; 346/76 PH; 400/103, 120, 104, 110; 364/900, 928

[56] References Cited

U.S. PATENT DOCUMENTS

| | | | |
|---|---|---|---|
| 3,786,237 | 1/1974 | Postal | 235/491 |
| 3,959,630 | 5/1976 | Hogberg | 235/491 |
| 4,079,482 | 3/1978 | Yeh | 197/1 A |
| 4,247,907 | 1/1981 | Durbeck et al. | 364/900 |
| 4,443,694 | 4/1984 | Sanford | 235/462 |
| 4,449,052 | 5/1984 | Krieg | 235/462 |
| 4,533,823 | 8/1985 | Vittorio | 235/375 |
| 4,590,366 | 5/1986 | Rothfjell | 235/462 |
| 4,602,152 | 7/1986 | Dittakavi | 235/462 |
| 4,659,416 | 4/1987 | Johansson | 156/384 |
| 4,661,001 | 4/1987 | Takai et al. | 400/103 |
| 4,685,138 | 8/1987 | Antes et al. | 235/468 |
| 4,777,357 | 10/1988 | Harada et al. | 235/462 |

FOREIGN PATENT DOCUMENTS 60-206679 10/1985 Japan .

OTHER PUBLICATIONS

L. D. Green and G. A. Fisher, "Simultaneous Typing and Magnetic Printing", IBM Technical Disclosure Bulletin, vol. 2, No. 5, Feb. 1960, p. 31.
"Colours and Fine Chemicals", ICI Colours and Fine Chemicals Business, Fine Chemicals Research Centre, Manchester, England, Feb. 1988.
"USS-2/5 Uniform Symbology Specification", Automatic Indentification Manufacturers, Inc., Pub. 1986.
"USS-39 Uniform Symbology Specification", Automatic Identification Manufacturers, Inc., Pub. 1986.

Primary Examiner—Douglas D. Watts
Assistant Examiner—Paul M Heyrana
Attorney, Agent, or Firm—Bernard, Rothwell & Brown

[57] ABSTRACT

A multi-readable information system includes a substrate material and one type of printed information that is readable by a first entity, such as information in machine readable bar code that is printed on an area of the substrate material. A different type of printed information occupies the same field area of the substrate material, such as information in human-readable symbology that is printed in at least a portion of the area occupied by the bar code. The bar code is printed in a first ink that can be read utilizing energy of a first wavelength and the human-readable symbols are printed in a second ink that can be read in a humanly visible wavelength. The humanly visible ink absorbs insufficient energy in the first wavelength to prevent reading of the bar code by a bar code-reading machine and the bar code does not interfere with the readability of the human-readable symbols.

9 Claims, 2 Drawing Sheets

MULTI-READABLE INFORMATION SYSTEM

BACKGROUND OF THE INVENTION

1. Field of the Invention

The present invention relates to the field of providing printed information in multi-readable form, such as in both human-readable and machine-readable form.

2. Description of the Background Art

Information in the form of machine-readable such as bar codes, is increasingly being used to facilitate the handling of a wide range of articles. This expanding use of machine-readable codes continues to escalate with the increased use of automatic equipment in handling of articles.

During the handling and distribution of product containing cartons or cases, Frito-Lay, Inc., the assignee of the present invention, utilizes product case labels having bar coded information concerning the contents of the product cases. However, since human loaders, warehousemen, route salesmen and the like continue to handle these cases, it is desirable that the case labels contain both human readable and machine-readable data.

Labels containing both human-readable and machine readable data are known in the art, see, for example, U.S. Pat. Nos. 4,661,001 for *Label Printer With Test Pattern for Price and Bar Codes* and 4,659,416 for *Terminal Bar Code Printer for Label Applicator*. However, the labels disclosed in these patents print the human-readable and machine-readable data on two separate areas of the same label. Other publications that disclose human-readable and machine-readable information printed on separate areas of a surface are U.S. Pat. Nos. 4,247,907 for *Method and Apparatus for Typing Characters and Optically Readable Binary Representations Thereof on Same Page* and 4,079,482 for *Electronic Data Processing of Chinese Characters*, Japanese Patent Publication No. 60-206679 for *Printer for Bar Code Label With Article Name*, and IBM Technical Disclosure 209-111.5 entitled *Simultaneous Typing and Magnetic Printing* by Green and Fisher.

When printing human-readable and machine-readable information onto separate areas of the same label, the requirement for label surface area is increased, and consequently the label expense is increased without any increase in readability of either the human-readable or the machine-readable information. There thus remains a need in the art for improvements in labels and the like that contain both human-readable and machine-readable information.

SUMMARY OF THE INVENTION

The present invention is a multi-readable information system wherein one type of printed information that is readable by a first entity occupies the same field area as a different type of printed information readable by another entity, without interference in readability of either. According to one embodiment, the invention is comprised of printed information in the form of human-readable symbology combined with printed information in the form of machine-readable symbology, wherein the machine-readable symbology differs from the human-readable symbology. The human-readable symbology occupies at least a portion of an area that is also occupied by the machine-readable symbology, without either symbology interfering with the readability of the other. In another embodiment, one type of machine-readable symbology occupies at least a portion of the area occupied by a different type of machine-readable symbology, without either type of symbology interfering with the readability of the other.

DETAILED DESCRIPTION OF THE PREFERRED EMBODIMENTS

Figure 1:
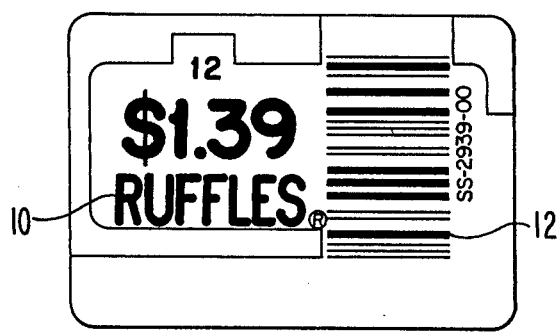
FIG. 1 is a plan view of prior art-type label having human-readable and machine-readable information occupying separate areas of the label.

With reference to the Figures, the same elements in each figure are identified by the same reference numerals.

FIG. 1 illustrates a prior art-type label wherein printed information that is in the form human-readable symbology 10 is located in a separate area of the label from printed information that is in the form of machine-readable symbology, in this case bar code 12.

Figure 2:
FIG. 2 is a plan view of a label in accordance with one embodiment of the invention with the human-readable and machine-readable information occupying substantially the same area of label.

FIG. 2 illustrates a multi-readable information system according to one embodiment of the present invention wherein the human-readable symbology 10 occupies an overlapping area with the machine-readable symbology 12 without either of the symbologies interfering with the readability of the other. In the embodiment shown in FIG. 2, the area occupied by the machine-readable symbology is about the same as the area occupied by the human-readable symbols.

Figure 6A:
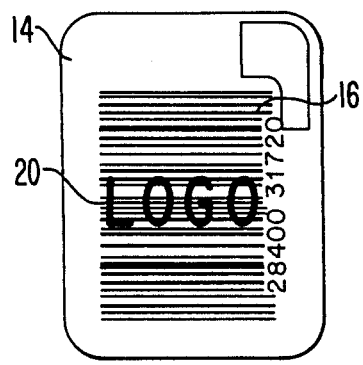
FIGS. 6A–6C are schematic plan views showing machine-readable bar code information occupying the same areas respectively as human-readable logo, and trademark/service mark information, and Optical Character Recognition (OCR)-readable information.
Figure 6B:
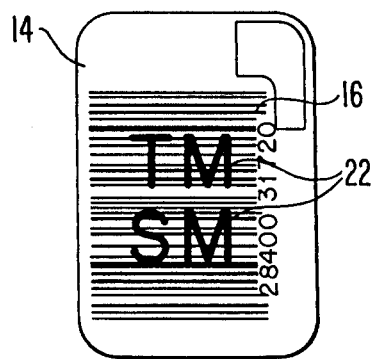

In the embodiment shown in FIG. 2, the human-readable symbology is selected from the group consisting of letters of the Roman alphabet, Arabic numerals and combinations thereof. In other embodiments, the human-readable symbology can be characters of foreign alphabets, color codes for human recognition at a glance, or any other human-readable symbols, such as a logo 20 or a trademark/service mark 22, as shown schematically in FIGS. 6A and 6B respectively.

Figure 6C:
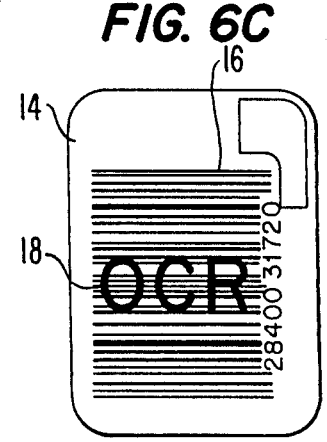

In the embodiment shown in FIG. 2, the machine-readable symbology is comprised of a bar code. Bar codes, such as the USS-I 2/5 and USS-39 codes, the European Article Numbering Code (EAN-Code), and the Universal Product Code (UPC-Code), are composed of a plurality of bars having different widths and spaces, which symbolize figures or digits. The machine-readable symbology can also be characters 18 that are readable by Optical Character Recognition (OCR) readers, as shown in FIG. 6C.

Bar code-reading machines and OCR readers have energy sources (illuminators) and sensors that operate together at energy wavelengths selected to operate in conjunction with the ink with which the machine-readable symbology is printed and the substrate on which the machine-readable symbology is printed. The wavelengths of interest are in the infrared (particularly near infrared), visible light and ultra-violet wavelengths.

In the embodiments shown, the substrate material comprises a label 14, although the substrate could be any suitable material wherein such information is desired, such as packaging materials, labels and tags, manufactured articles and equipment parts, credit cards and printed documents. The substrate medium is chosen to have a high diffuse reflectance with respect to the particular wavelengths to which the readers are sensitive. In practice, the substrate is generally white in the visible spectrum, and/or generally non-absorbing in the machine reading spectrum. Alternatively, it may be preferred that the substrate medium be absorbing and the machine-readable symbology be reflective, such as when the machine-readable symbology is sensitive to ultra-violet wavelengths.

Different color inks that are absorbing or reflective at desired wavelengths are utilized to print the human-readable and machine-readable messages. Inks having very specific energy absorption and reflection characteristics are commercially available from, for example, Imperial Chemical Industries, Ltd., ICI PLC Organics Division, Manchester England, and can be custom made if desired.

In the embodiment shown in FIG. 2, the machine-readable symbology, a bar code, is printed on the substrate material in a first ink that can be read utilizing energy of a first wavelength (such as an infrared wavelength). The machine-readable ink absorbs energy at the infrared wavelength and therefore appears dark relative to the appearance of the substrate to a reading machine operating at an infrared wavelength. The machine-readable ink is further selected so that it reflects energy at visible wavelengths and therefore appears light, white, off-white or unobtrusive to a human reader with normal eyesight.

The human-readable symbology is printed in the same field area as the machine-readable bar code, in a second ink that can be read in the humanly visible spectrum. The human-readable ink absorbs energy in the visible spectrum and is accordingly visible to a human with normal eyesight. The human-readable ink is further selected to absorb very little energy in the infrared spectrum so as not to interfere with the infrared reading machine's sensitivity to the bar code message. Thus, the ink utilized for the human-readable message does not absorb sufficient energy in the wavelength utilized to read the bar code to prevent reading of the bar code by bar code-reading machine, and the bar code does not interfere with the readability of the human-readable symbology.

Figure 3:
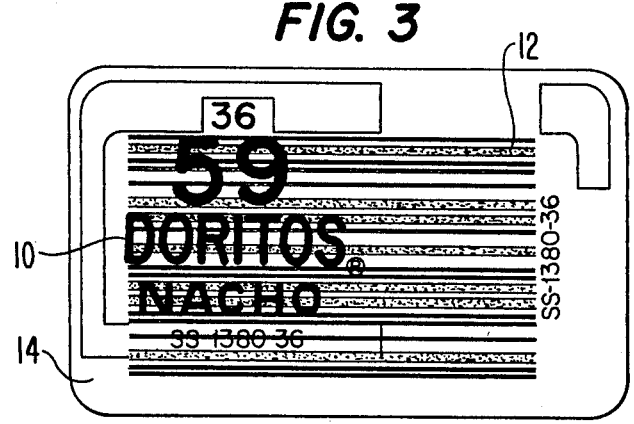
FIG. 3 is a plan view of a label in accordance with another embodiment of the invention, wherein the human-readable occupies only a portion of the area occupied by information.

In the embodiment shown in FIG. 3, although human-readable symbology 10 is printed in the same field area as machine readable symbology 12, the area occupied by the machine-readable symbology 12 is substantially larger than the area occupied by the human-readable symbology 10. Although the size of the label shown in FIG. 3 is substantially the same as the prior art label shown in FIG. 1, the label in FIG. 3 according to the present invention is considerably more machine-readable than the prior art label shown in FIG. 1 since it has more than double the machine scanning area, and so has the ability to improve the effectiveness of machine readers.

Figure 4:
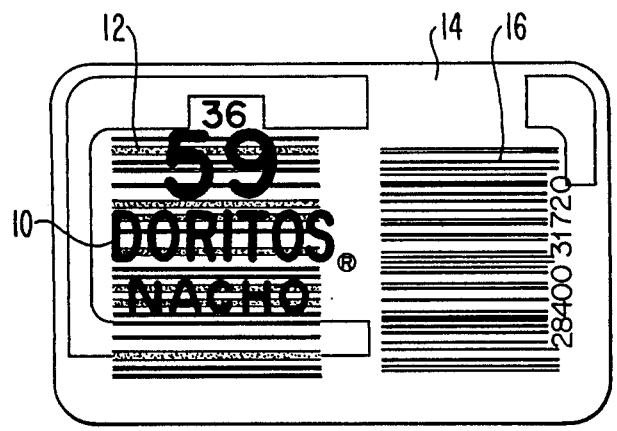
FIG. 4 is a plan view of a label in accordance with yet another embodiment of the invention wherein human-readable and machine-readable information occupies one area occupies an area of the label.

FIG. 4 shows another embodiment of the invention wherein human-readable information 10 occupies the same area as machine-readable information 12 in a first area of label 14. The label shown in FIG. 4 further includes an adjacent second area of machine-readable symbols 16, which can, for example, be a UPC-Code that may be used for in-store inventories and pricing. The increased value of a label in accordance with the embodiment shown in FIG. 4 is in the additional information that the label carries, in a total label area of substantially the same size as the prior art label shown in FIG. 1.

Figure 5:
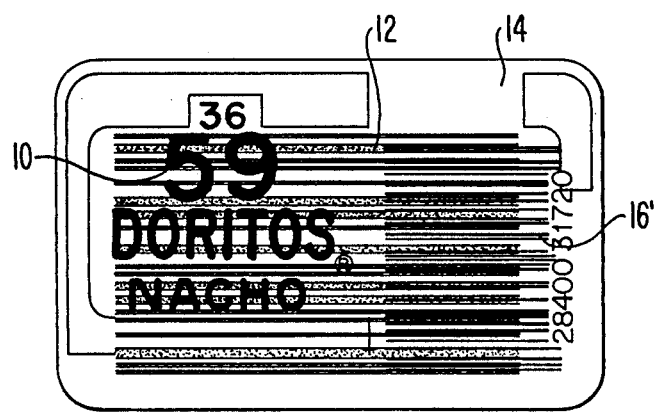
FIG. 5 is a plan view of a label in accordance with still another embodiment of the invention wherein two types of machine-readable information occupy a portion of the same area of the label, and wherein human-readable information occupies a portion of the same area of the label as on of the machine-readable types.

In the embodiment shown in FIG. 5, human-readable information 10 occupies one portion of the same field area of label 14 as a first type of machine-readable symbology 12. The label shown in FIG. 5 further includes an adjacent second area of a different type of machine-readable symbology 16,, that occupies another portion of the same field area as the first type of machine-readable symbology 12, and which can, for example, be a UPC-Code that may be used for in-store inventories and pricing. According to this embodiment, one type of machine-readable symbology occupies the same area as a different type of machine-readable symbology, without either type interfering with the readability of the other. The increased value of a label in accordance with the embodiment shown in FIG. 5 is in the additional information that the label carriers and the simultaneous use of two or more differently readable symbologies in the same field area, all in a total label area of substantially the same size as the prior art label shown in FIG. 1.

The invention is further illustrated by the following example, which is not intended to be limiting.

EXAMPLE

This Example depicts the label shown in FIG. 2 and utilizes a white paper label having a high diffuse reflectance for the wavelengths used herein. Machine-readable information and human-readable information is sequentially printed on the substrate label, each with a different ink. The machine-readable message is printed with an ink selected for the following properties:

(a) the machine-readable ink absorbs energy at infrared wavelengths such as from about 710 nanometers to about 870 nanometers and therefore appears dark relative to the appearance of the white substrate to a bar code-reading machine operating at such wavelengths, and (b) the machine-readable ink reflects energy at visible wavelengths such as between about 400 nanometers and about 700 nanometers and therefore appears light, white, off-white or unobtrusive to a human reader having normal eyesight.

The human-readable message is printed in an ink selected for two different properties, as follows:

(a) the human-readable ink absorbs energy in the visible spectrum and is accordingly visible to a human with normal eyesight, and (b) the human-readable ink absorbs very little energy in the infrared spectrum and accordingly does not interfere with the infrared reading machine that reads the machine-readable ink message.

The machine-readable ink is printed as a bar code on an area of the substrate label, and a human-readable message is printed in human-readable ink in the same field area as the bar code on the substrate material. The human readable message does not prevent reading of the bar code by a bar code-reading machine, and the bar code does not interfere with the readability of the human-readable symbols by humans.

Since many modifications, variations and changes in detail may be made to the described embodiments, it is intended that all matter in the foregoing description and shown in the accompanying drawings be interpreted as illustrative and not in a limiting sense.

I claim:

1. A multi-readable information system, comprising a substrate on which there is printed information in the form of human-readable symbology, and printed information in the form of machine-readable symbology, wherein the machine readable symbology differs from the human-readable symbology, the human-readable symbology occupies at least a portion of an area that is also occupied by the machine-readable symbology without either symbology interfering with the readability of the other, the machine-readable symbology is printed in a first ink that can be read utilizing energy of a first wavelength, the human-readable symbology is printed in a second ink that differs from the said first ink and can be read in a humanly visible wavelength that differs from said first wavelength, which second ink does not absorb sufficient energy in said first wavelength to prevent reading of the machine readable symbology by a compatible machine, and wherein the substrate material reflects both said first wavelength and said humanly visible wavelength.

2. The multi-readable information system of claim 1 wherein one of said symbologies is printed over the other. wherein said first wavelength is an infrared wavelength.

3. The multi-readable information system of claim 3 wherein said first wavelength is an infrared wavelength.

4. The multi-readable information system of claim 3 wherein the human-readable symbology is selected from the group consisting of logos, service marks, trademarks and color codes.

5. The multi-readable information system of claim 1 wherein the area occupied by the machine-readable symbology is substantially larger than the area occupied by the human readable symbology.

6. The multi-readable information system of claim 1 wherein the area occupied by the machine-readable symbology is about the same as the area occupied by the human-readable symbology.

7. The multi-readable information system of claim 1 further including a second machine-readable symbology having printed information different from the printed information contained in the first machine-readable symbology.

8. A multi-readable information system, comprising a substrate material, information in machine-readable bar code that is printed on an area of the substrate material, and information in human-readable symbology that occupies at least a portion of the area occupied by the bar code; wherein the bar code is printed in a first ink that can be read utilizing energy of a first wavelength and the human-readable symbology is printed in a second ink that differs from said first ink and can be read in a humanly visible wavelength that differs from said first wavelength, which second ink does not absorb sufficient energy in said first wavelength so as to prevent reading of the bar code by a bar code-reading machine, and the bar code does not interfere with the readability of the human-readable symbology; and wherein the substrate material reflects both said first wavelength and said humanly visible wavelength.

9. A multi-readable information system, comprising a substrate on which there is a printed information in the form of a first type of machine-readable symbology combined with printed information in the form of a different type of machine-readable symbology, wherein the first type of machine-readable symbology occupies at least a portion of an area that is also occupied by said different type of machine readable symbology without either type of symbology interfering with the readability of the other, the first type of machine-readable symbology is printed in a first ink that can be read utilizing energy of a first wavelength, said different type of machine-readable symbology is printed in a second ink that differs from said first ink and can be read utilizing energy of a different wavelength from said first wavelength, which second ink does not absorb sufficient energy in said first wavelength to prevent reading of the first type of machine-readable symbology by a first machine compatible therewith; which first ink does not absorb sufficient energy in said different wavelength to prevent reading of said different type of machine readable symbology by a different machine compatible therewith, and wherein the substrate material reflects both said first wavelength and said different wavelength.

* * * * *

UNITED STATES PATENT AND TRADEMARK OFFICE
CERTIFICATE OF CORRECTION

Page 1 of 3

PATENT NO. : 4,889,367

DATED : December 26, 1989

INVENTOR(S) : L. Michael Miller

It is certified that error appears in the above-identified patent and that said Letters Patent is hereby corrected as shown below:

Cover page, right column, line 6, delete "USS-2/5" and substitute therefor -- USS-I 2/5 --;

Column 1, line 10, insert -- codes, -- after "machine-readable";

Column 1, line 16, insert -- (-) -- between "product" and "containing";

Column 1, line 23, insert -- (-) -- between "human" and "readable";

Column 1, lines 25-26, insert -- (-) -- between "machine" and "readable";

Column 2, line 13, insert -- the -- between "of" and "label";

Column 2, line 17, insert -- information -- between "human-readable" and "occupies";

Column 2, line 18, insert -- the machine-readable -- between "by" and "information";

Column 2, line 22, insert -- of the label and different machine-readable information -- between "area" and "occupies";

Column 2, line 22, insert -- adjacent -- between "an" and "area";

UNITED STATES PATENT AND TRADEMARK OFFICE
CERTIFICATE OF CORRECTION

PATENT NO. : 4,889,367
DATED : December 26, 1989
INVENTOR(S) : L. Michael Miller It is certified that error appears in the above-identified patent and that said Letters Patent is hereby corrected as shown below:

Column 2, line 28, "on" should be -- one --;

Column 3, line 60, "machine" should be -- machines --;

Column 3, line 65, insert -- (-) -- between "machine" and "readable";

Column 4, line 25, "16,," should be -- 16', --;
Column 5:
Claim 1, line 34, insert -- (-) -- between "machine" and "readable";

Claim 2, lines 40-41, delete "wherein said first wavelength is an infrared wavelength";

Claim 3, line 42, "3" should be -- 1 --;

Claim 4, line 44, "3" should be -- 1 --;

UNITED STATES PATENT AND TRADEMARK OFFICE
CERTIFICATE OF CORRECTION

PATENT NO. : 4,889,367

DATED : December 26, 1989

INVENTOR(S) : L. Michael Miller

It is certified that error appears in the above-identified patent and that said Letters Patent is hereby corrected as shown below:

Column 5:

Claim 5, line 52, insert -- (-) -- between "human" and "readable";

Column 6:

Claim 9, line 28, delete "a";

Claim 9, line 34, insert -- (-) -- between "machine" and "readable";

Claim 9, line 47, insert -- (-) -- between "machine" and "readable".

Signed and Sealed this

Seventh Day of July, 1992

Attest:

DOUGLAS B. COMER

Attesting Officer     Acting Commissioner of Patents and Trademarks